(12) United States Patent
Fusaka

(10) Patent No.: US 8,544,085 B2
(45) Date of Patent: Sep. 24, 2013

(54) IMAGE PROCESSING APPARATUS, IMAGE PROCESSING METHOD, AND IMAGE FORMING APPARATUS

(75) Inventor: Yoshifumi Fusaka, Kyoto (JP)

(73) Assignee: Sharp Kabushiki Kaisha, Osaka (JP)

(*) Notice: Subject to any disclaimer, the term of this patent is extended or adjusted under 35 U.S.C. 154(b) by 1263 days.

(21) Appl. No.: 12/366,272

(22) Filed: Feb. 5, 2009

(65) Prior Publication Data
US 2009/0210941 A1 Aug. 20, 2009

(30) Foreign Application Priority Data
Feb. 19, 2008 (JP) .................................. 2008-037709

(51) Int. Cl.
*G06F 21/00* (2013.01)

(52) U.S. Cl.
USPC ...... 726/19; 726/4; 726/5; 713/156; 713/176; 713/193

(58) Field of Classification Search
USPC ......................................................... 726/19
See application file for complete search history.

(56) References Cited

U.S. PATENT DOCUMENTS

| | | | |
|---|---|---|---|
| 5,153,918 A * | 10/1992 | Tuai ............................... | 713/182 |
| 6,745,334 B1 * | 6/2004 | Ikegami ......................... | 726/19 |
| 7,457,585 B2 * | 11/2008 | Katoh ........................... | 455/41.2 |
| 2003/0145219 A1 * | 7/2003 | Cossel et al. ................... | 713/200 |
| 2004/0143765 A1 * | 7/2004 | Kazawa et al. ................ | 713/202 |
| 2005/0108549 A1 * | 5/2005 | Kanai ............................ | 713/182 |
| 2006/0001899 A1 * | 1/2006 | Kanno .......................... | 358/1.14 |
| 2006/0028661 A1 * | 2/2006 | Uruma ........................... | 358/1.6 |
| 2006/0061843 A1 * | 3/2006 | Sadakuni ....................... | 358/523 |
| 2006/0061847 A1 * | 3/2006 | Itami ............................. | 359/205 |
| 2007/0008569 A1 * | 1/2007 | Shimazawa .................. | 358/1.14 |
| 2007/0070820 A1 * | 3/2007 | Gallant ......................... | 368/108 |
| 2007/0180253 A1 | 8/2007 | Hamaguchi | |
| 2007/0188791 A1 * | 8/2007 | Utsunomiya et al. ........ | 358/1.13 |
| 2007/0214185 A1 * | 9/2007 | Fujiwara ....................... | 707/200 |
| 2008/0178268 A1 * | 7/2008 | Kodaira .......................... | 726/4 |
| 2008/0192287 A1 * | 8/2008 | Iwai ............................. | 358/1.15 |
| 2010/0238481 A1 * | 9/2010 | Homma ....................... | 358/1.14 |

FOREIGN PATENT DOCUMENTS

| | | |
|---|---|---|
| JP | 2006-321063 | 11/2006 |
| JP | 2006-341404 | 12/2006 |
| JP | 2007-044989 | 2/2007 |
| JP | 2007-208573 | 8/2007 |
| JP | 2007-237685 | 9/2007 |

* cited by examiner

*Primary Examiner* — Kambiz Zand
*Assistant Examiner* — Yonas Bayou
(74) *Attorney, Agent, or Firm* — Edwards Wildman Palmer LLP; David G. Conlin; Steven M. Jensen

(57) ABSTRACT

Provided is an image forming apparatus that improves operability while securing security of image data stored in an apparatus. In the image forming apparatus having a filing function, when image data is stored with the filing function, a password of a user authenticated by an authenticating portion is set as a password for storing the image data, and at the time of reading image data with the filing function, when the password of the user authenticated by the authenticating portion is set to the image data, the password of the image data is released.

7 Claims, 7 Drawing Sheets

ASSOCIATION TABLE

| FOLDER NAME | FILE NAME | PASSWORD SETTING CLASSIFICATION | PASSWORD | USER NAME |
|---|---|---|---|---|
|  |  |  |  |  |

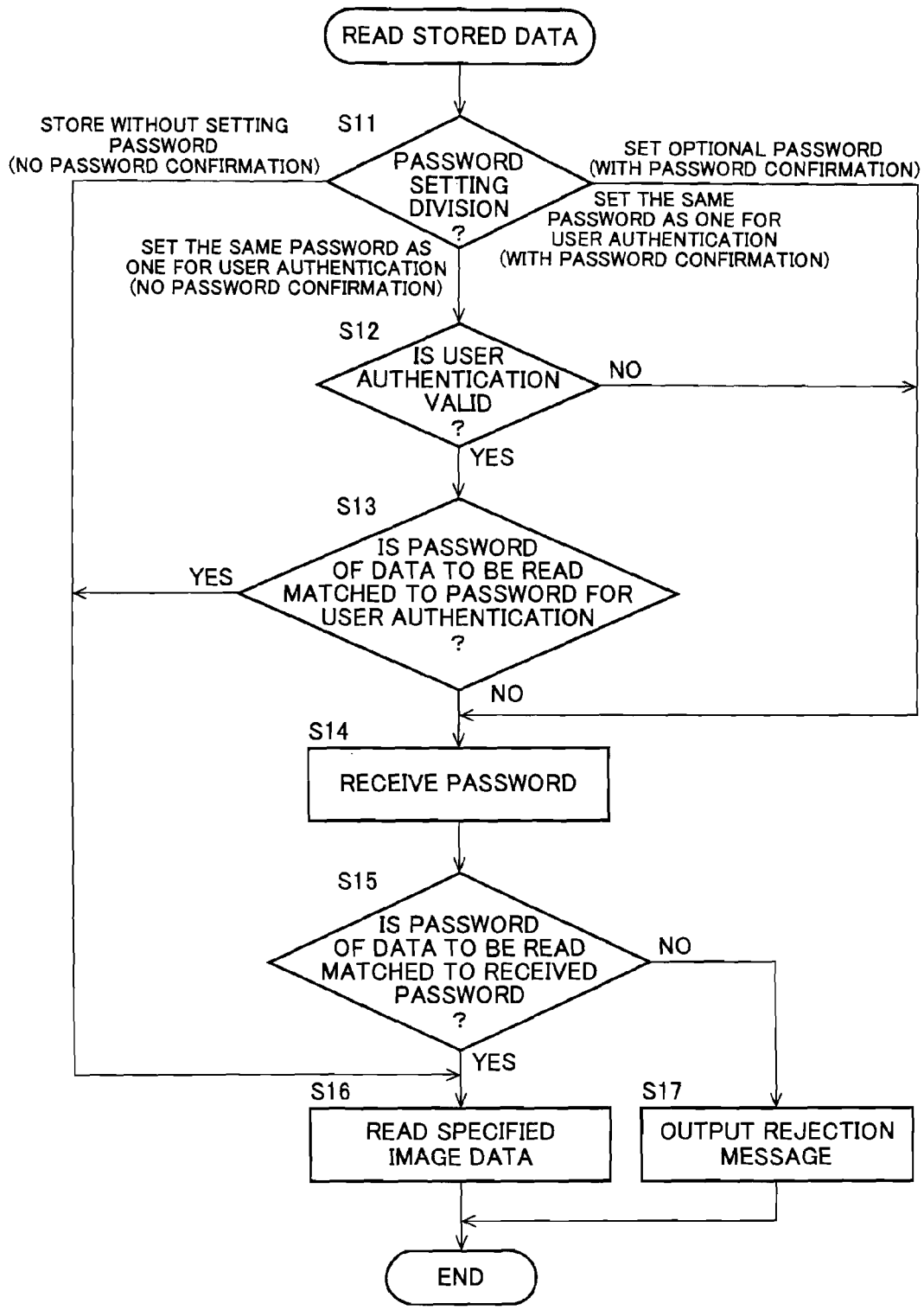

IMAGE PROCESSING APPARATUS, IMAGE PROCESSING METHOD, AND IMAGE FORMING APPARATUS

CROSS-NOTING PARAGRAPH

This non-provisional application claims priority under 35 U.S.C. §119 (a) on Patent Application No. 2008-037709 filed in JAPAN on Feb. 19, 2008, the entire contents of which are hereby incorporated herein by reference.

FIELD OF THE INVENTION

The present invention relates to an image processing apparatus, an image processing method, and an image forming apparatus, and to an image processing apparatus, an image processing method, and an image forming apparatus that improves operability while securing security of image data stored in the apparatus.

BACKGROUND OF THE INVENTION

Today, many digital multifunctional peripherals are introduced in general office environment. The digital multifunctional peripheral incorporates multiple functions, including a scanner function, a copy function, a print function, and a facsimile function, contains a hard disk, and is highly functionalized so as to connect to a network to operate Web browsers and Java (registered trademark) applications as well.

In this way, since the digital multifunctional peripheral is used not only as a copier, a printer, a facsimile, and the like, but also as a document filing terminal and a network terminal, it is necessary to take security measures sufficiently to unauthorized usage and data leakage.

As a method for authenticating a usage right of a user, user authentication is used that a user presents authentication information (a password or information of an IC card, or biological information such as fingerprint and an eyeball), which is collated with authentication information of a usage permitted user registered in a digital multifunctional peripheral in advance, and when coinciding with the authentication information, the user is authenticated and is allowed to use the digital multifunctional peripheral (Japanese Laid-Open Patent Publications No.2006-321063 and No.2007-44989).

In an image forming apparatus of Japanese Laid-Open Patent Publications No.2006-321063, when storing image data having been subjected to printing, the image data is stored in a file with a generated data name, and authentication information received from a user and the generated data name are registered in a main body in association with each other. Further, the generated data name is encrypted and stored in a storage medium. In addition, at the time of printing the stored image data, the encrypted data name stored in the storage medium is decrypted, and when the authentication information received from the user and the decrypted data name are registered in the main body, printing is performed.

Moreover, in an image forming apparatus of Japanese Laid-Open Patent Publications No.2007-44989, at the time of storing image data having been subjected to printing, when a user has been authenticated, the image data is stored in a box corresponding to the authenticated user. This box includes a named box specified by a user and an unnamed box whose name is not specified by a user. At the time of performing printing using stored image data, when a user has been authenticated, a list of file names of image data stored in a (named or unnamed) box corresponding to the authenticated user is displayed. Accordingly, it is possible to select desired image data from the list of file names concerning the user.

However, in a technology of Japanese Laid-Open Patent Publications No.2006-321063, authentication information (password) is requested when storing or using image data used for printing, thus posing a problem of complicating an input operation of a user.

Moreover, in a technology of Japanese Laid-Open Patent Publications No.2007-44989, if once authentication is performed for image data used for printing by a user, authentication information (password) is not requested every time, thus improving operability of a user. However, it is impossible to recognize existence of image data stored by other users, thus posing a problem that printing using image data stored by a coworker can not be performed.

SUMMARY OF THE INVENTION

An object of the present invention is to provide an image processing apparatus, an image processing method, and an image forming apparatus that improves operability while securing security of image data stored in an apparatus.

In order to solve the above described problems, an image forming apparatus of the present invention has following configuration.

An image processing apparatus has a filing function, an authenticating portion for authenticating a user, and a control portion, and in the control portion,
(1) when specified image data is stored with the filing function, an optional password is set or a classification of whether or not a password is confirmed in reading is acquired, and when setting of an optional password is specified, a password is acquired, and the acquired password is stored in a storage potion in association with the image data, alternatively, when the classification of whether or not a password is confirmed is specified, a password authenticated by the authenticating portion and the classification are stored in the storage portion in association with the image data,
(2) when specified image data is read with the filing function,
(2-1) when the classification corresponding to the image data is set to confirm a password, input of a password is requested and whether or not reading is capable is determined based on the entered password and a password corresponding to the image data,
(2-2) when the classification corresponding to the image data is set not to confirm a password, whether or not reading is capable is determined based on the password authenticated by the authenticating portion and the password corresponding to the image data, and
(2-3) when the password corresponding to the image data and the password authenticated by the authenticating portion are different, input of a password is requested and whether or not reading is capable is determined based on the entered password and the password corresponding to the image data.

Furthermore, when a predetermined time has elapsed after user was authenticated, or when a predetermined time has elapsed after a body sensor has not detected a human, the control portion releases user authentication.

Furthermore, an image forming apparatus may include an image reading portion for reading an image, the image processing apparatus for performing image processing of read image data, and an image forming portion for performing image formation of a result of image processing.

BRIEF DESCRIPTION OF THE DRAWINGS

FIG. 8 is a flowchart showing processing procedure in the control portion when request to read image data is made with a filing function.

PREFERRED EMBODIMENTS OF THE INVENTION

Now, referring to the accompanying drawings, preferred embodiments according to the present invention will hereinafter be described. An image forming apparatus of the present embodiment will be described taking a digital multifunctional peripheral as an example without limitation, and is also applicable to, for example, an information processing apparatus for storing data inside the apparatus, allowing reading thereof.

Figure 1:
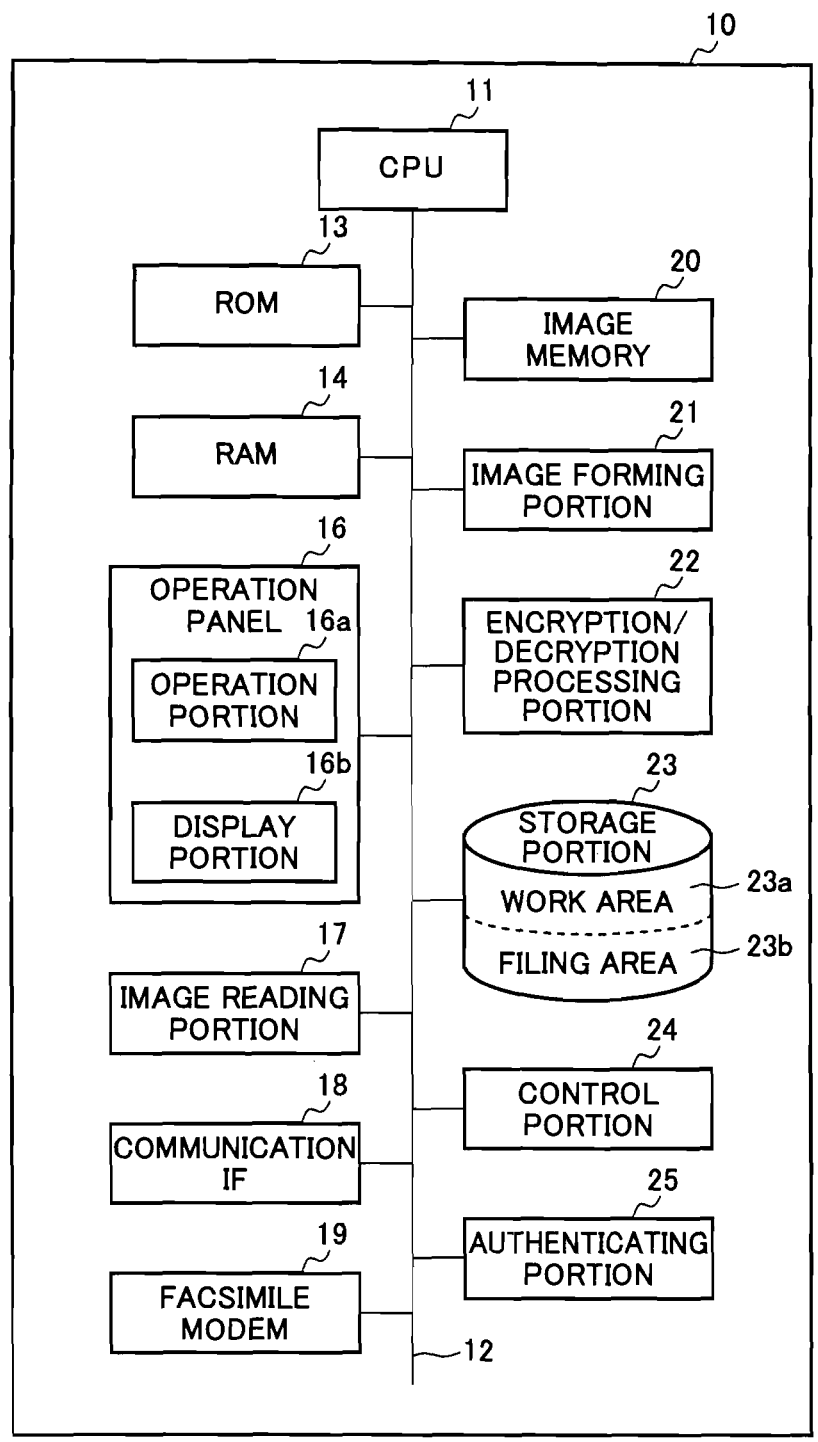
FIG. 1 is a block diagram showing the internal configuration of an image forming apparatus to which the present invention is applied.

FIG. 1 is a block diagram showing the internal configuration of an image forming apparatus to which the present invention is applied.

An image forming apparatus 10 to which the present invention is applied includes a CPU (Central Processing Unit) 11, and the CPU 11 loads and executes a control program previously stored in a ROM (Read Only Memory) 13 on a RAM (Random Access Memory) 14 to thereby control various kinds of hardware connected through a bus 12 and operate the image forming apparatus according to the present invention as a whole.

The configuration of various kinds of hardware connected through the bus 12 will hereinafter be described.

Figure 2:
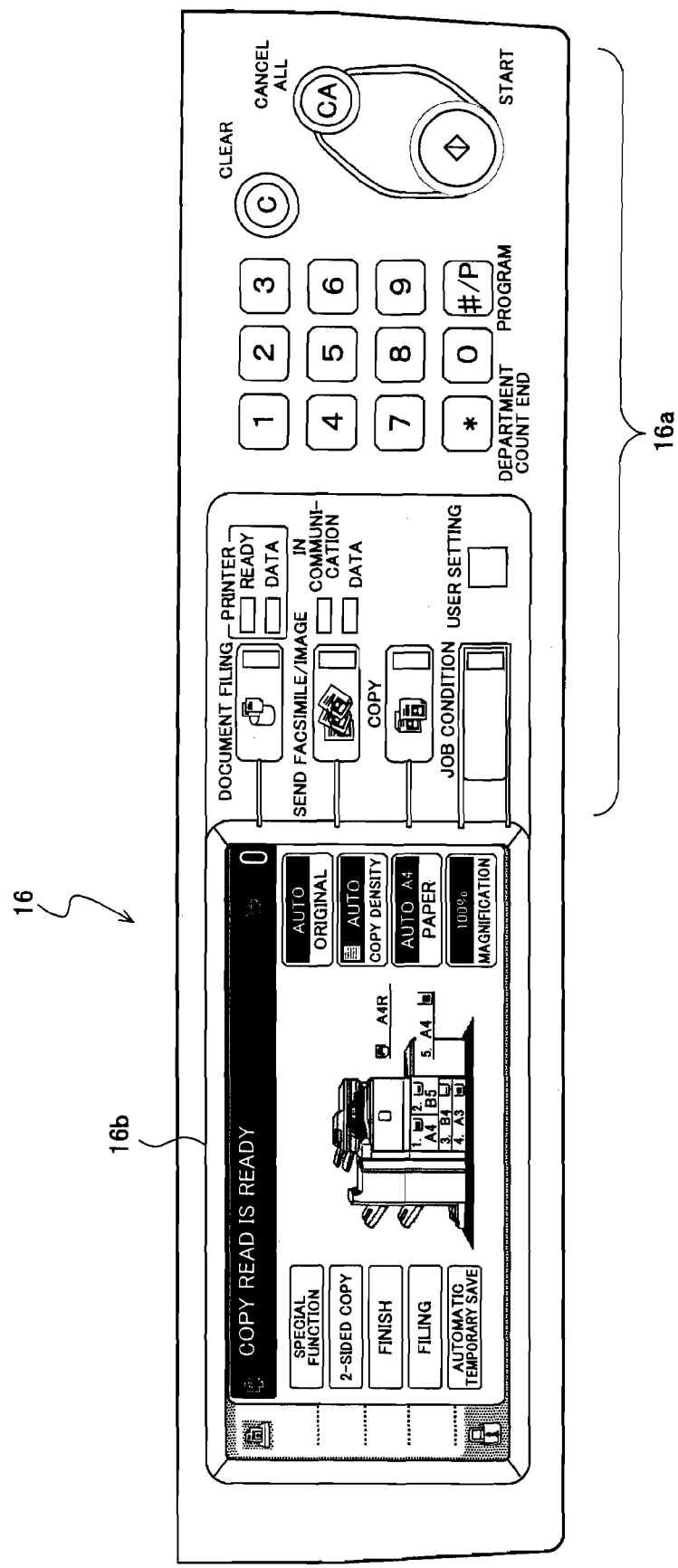
FIG. 2 is a view showing an operation panel of the image forming apparatus, which shows display in a copy mode.

An operation panel 16 is composed by an operation portion 16a for receiving an operation by a user and a display portion 16b for displaying information to be informed to a user (FIG. 2).

FIG. 2 is a view showing the operation panel of the image forming apparatus (digital multifunctional peripheral), which shows display when the digital multifunctional peripheral is in a copy mode.

The operation portion 16a has a key group disposed adjacent to a liquid crystal panel in addition to a touch panel, which includes a start key for instructing copy start, a cancel all key for stopping processing in execution, a clear key for clearing contents of an instructed mode, a numeric keypad for instructing the number of copies, a switch key for each mode, and a user setting key.

The display portion 16b is composed by, for example, a liquid crystal panel of a dot matrix type, and is capable of guiding and displaying information in detail to be informed to a user. In addition, a transparent touch panel is provided on a screen of the liquid crystal panel, and the touch panel is operated in accordance with information displayed on the liquid crystal panel. The touch panel is a component of the operation portion 16a for entering instruction information.

Moreover, the display portion 16b stands by in a state where a basic screen of "copy mode" is displayed as an initial screen. An external view of the present apparatus is displayed on an almost center area of the basic screen so that the system configuration (configuration of a large capacity paper feed cassette, a finisher unit or the like) is visible. In addition, a selected mode, a selected paper feed tray, information of image formation, and the like are also displayed together.

In an upper area of the display portion 16b, a message display area is secured to inform a user of condition of the apparatus, advice, and the like. Further, the display portion 16b has a right-side area where a key group for selecting a basic function (mode) as the image forming apparatus is displayed, and a left-side area where a key group for selecting a special function (mode) mounted to the image forming apparatus is displayed.

An image reading portion 17 includes a light source for irradiating light to a document to be read, an image sensor like a CCD (Charge Coupled Device), an AD converter, and the like, and focuses an image of a document set at a predetermined reading position to the image sensor to convert into an analogue electric signal, and converts the obtained analogue electric signal to digital signal with the AD converter. Then, the digital signal obtained by AD conversion is applied with correction of light distribution characteristic of the light source in document reading, sensitivity unevenness of the image sensor, and the like, to thereby generate image data of a digital format.

A communication IF 18 includes an interface in compliance with a predetermined communication standard of a local area network or the like, and controls transmission/reception of various kinds of data to/from a connected external computer. For example, the communication IF 18 receives a print job from the connected external computer, and transmits information to be informed.

A facsimile modem 19 includes a line termination circuit for connecting an external facsimile apparatus, and performs transmission/reception of facsimile data through a public telephone line network. Hence, the facsimile modem 19 includes a decoding circuit for decoding received facsimile data and an encoding circuit for encoding facsimile data to be transmitted.

An image memory 20 is composed by a semiconductor memory, and temporarily stores image data generated by reading an image of a document with the image reading portion 17, image data developed from a print job, and image data developed from facsimile data.

In response to each purpose of using, image data temporarily stored in the image memory 20 is transferred to an image forming portion 21 when performing image formation on a sheet, transferred to the facsimile modem 19 when transmitting as facsimile data, or transferred to a storage portion 23 when storing using a filing function.

The image forming portion 21 forms an image on a sheet based on image data transferred from the image memory 20. Hence, the image forming portion 21 includes a charging unit for charging a photoreceptor drum at a predetermined potential, a laser writing device for irradiating laser light depending on image data received from outside to generate an electrostatic latent image on the photoreceptor drum, a developing unit for supplying toner to the electrostatic latent image formed on the surface of the photoreceptor drum to visualize, a transfer unit for transferring a toner image formed on the surface of the photoreceptor drum onto a sheet, for forming an image on a sheet by electrophotography. Note that, image formation may be performed by an inkjet process, a thermal transfer process, a sublimation process, or the like, in addition to by electrophotography.

An encryption/decryption processing portion 22 performs encryption of data stored in the storage portion 23 and decryption of data read from the storage portion 23. Hence, the encryption/decryption processing portion 22 includes an input buffer for entering data to be encrypted or decrypted, a calculator for applying calculating processing for which a predetermined encryption algorithm is implemented to data set to the input buffer, an output buffer for holding a calculation result by the calculator, and the like.

Data to be encrypted or data to be decrypted is entered into the input buffer, the entered data is extracted from the input buffer to be applied with calculating processing by the calculator, and the calculation result is written into the output buffer when the calculating processing is completed.

The storage portion 23 is composed by a nonvolatile memory such as a hard disk device, and a part of a storage area thereof is used as a data area for storing image data and the like.

The data area is composed by a work area 23a for mainly holding work data temporarily, and a filing area 23b for arranging and storing data for each file format of data, for each processing mode of a printer function, a scanner function, a copy function, a facsimile function, and the like, or for each folder created by a user, so as to be in a stored state unless an erasure instruction or the like is given.

When a request is received through the operation panel 16, or when a request is received from an external computer, image data is stored in the filing area 23b or image data stored in the filing area 23b is read. For example, in the case of failure of print processing or in the case of lacking in the number of output copies, a user is capable of performing print processing of image data stored in the filing area 23b.

The control portion 24 controls a whole of the apparatus by controlling an image reading function, an image forming function, a communication function, a filing function, and the like.

For example, image data is received from the image reading portion 17 by an instruction through the operation portion 16a and transmitted to the image forming portion 21 to be applied with image formation, and in addition, image data read by the image reading portion 17 is stored in the filing area 23b or read image data from the filing area 23b, with the filing function. Further, image data received through a network from an external computer by the communication IF 18 with the filing function is stored in the filing area 23b or the read image data from the filing area 23b is transmitted to the external computer.

An authenticating portion 25 is authenticating means for performing user authentication. User authentication is performed such that, for example, a user name or authentication information entered from the operation portion 16a or the like is received through the control portion 42, and the entered authentication information and authentication information stored in the storage portion 23 corresponding to the entered user name are compared, and when they are matched, the user is authenticated as a user of the entered user name.

Here, as the authentication information, biological information such as fingerprint and an eyeball may be used, without limitation to a password.

In addition, an image processing apparatus to which the present embodiment is applied has the configuration of the above described image forming apparatus 10, except for the image reading portion 17 and the image forming portion 21.

Now, detailed contents of the present invention will be described. In the followings, description will be given taking confidential storing and confidential reading of a filing function as an example. A confidentially stored file is added with a password for confidential storing and is stored in the filing area 23b of the storage portion 23. Moreover, the confidentially stored file can not be read unless a user enters the same password as the password for confidential storing.

Figure 3:
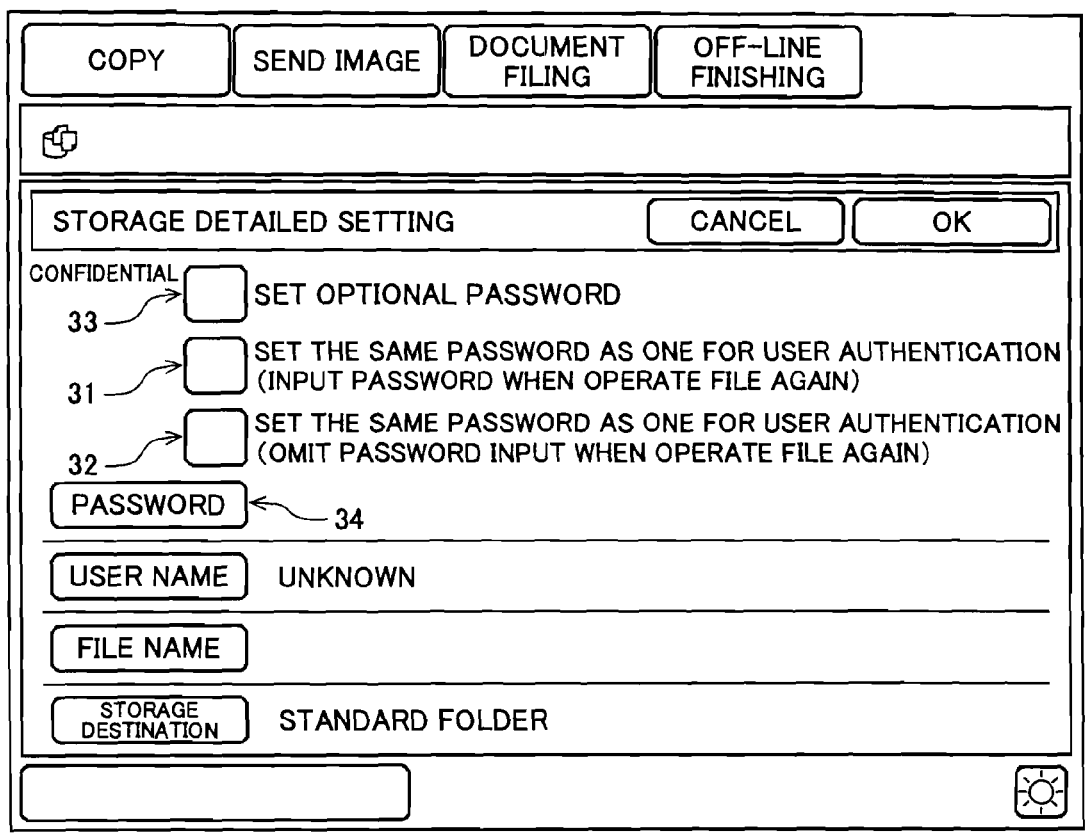
FIG. 3 shows an example of a setting screen for confidential storing.

FIG. 3 shows an example of a setting screen for confidential storing. When a setting screen for confidential storing is opened by the authenticating portion 25 while setting of user authentication is valid, a screen for performing detailed setting to store a password for confidential storing, a user name, a file name, a storage destination (folder name) and the like is displayed.

FIG. 3 shows an example where two kinds of check boxes 31 and 32 having different effects in setting are provided.

When the check box 31 is made valid (checked), the same password as a password for user authentication is automatically set as a password for confidential storing, and when operating a file again (such as an operation of calling confidentially stored data to perform printing or transmission), it is requested to enter the password for confidential storing.

Moreover, the check box 32 is made valid (checked), the same password as a password for user authentication is automatically set as a password for confidential storing, and when operating a file again, input of the password for confidential storing, that is performed at that time, is omitted.

In addition, in FIG. 3, when a check box 33 is made valid (checked), confidential storing is enabled as well as a "password" button 34 for transitioning to an input setting screen of a password for confidential storing is turned into a state capable of being pressed.

Figure 4:
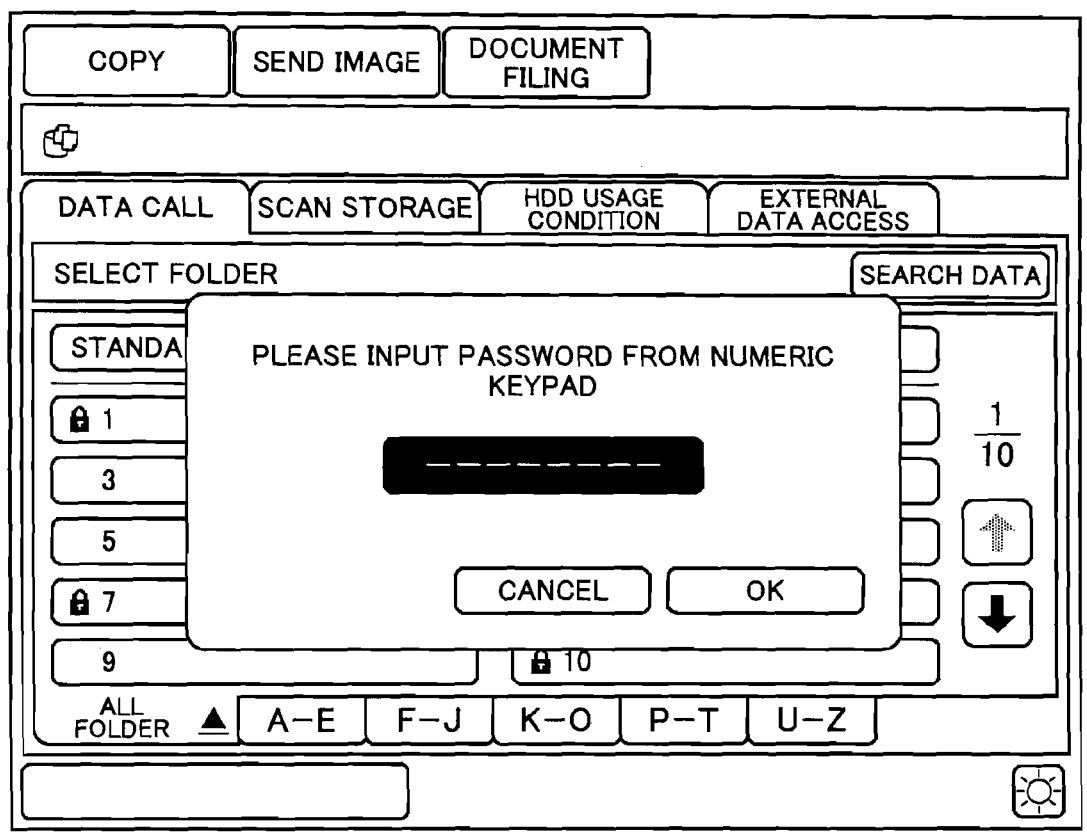
FIG. 4 shows an example of an input setting screen of a password for confidential storing.

When the "password" button 34 is pressed, an input setting screen of a password for confidential storing as shown in FIG. 4 is displayed, and a user enters a password from the operation portion 16a to press an "OK" button.

Various setting values set in FIG. 3 are associated with the following data items (a password setting classification, a password, a user name, a file name, and a storage destination) and stored in the storage portion 23 in association with the user.

Password setting classification: Any of "set optional password (with password confirmation)", "set the same password as one for user authentication (with password confirmation)", "set the same password as one for user authentication (no password confirmation)", and "store without setting password" is set.

Password: When a value of the password setting classification is "set optional password", a password entered by a user is set. Moreover, when a value of the password setting classification is "set the same password as one for user authentication (with password confirmation)" and "set the same password as one for user authentication (no password confirmation)", a password entered when a user performs user authentication is set. Note that, in the case of "store without setting password", no password is stored.

User name: A name of a user in authentication is set.

File name: A file name of image data entered from a user is set.

Storage destination: A name of a folder in which the above described file is stored is entered from a user, and the folder name is set. When no storage destination is entered, a default folder name is set.

Figure 5:
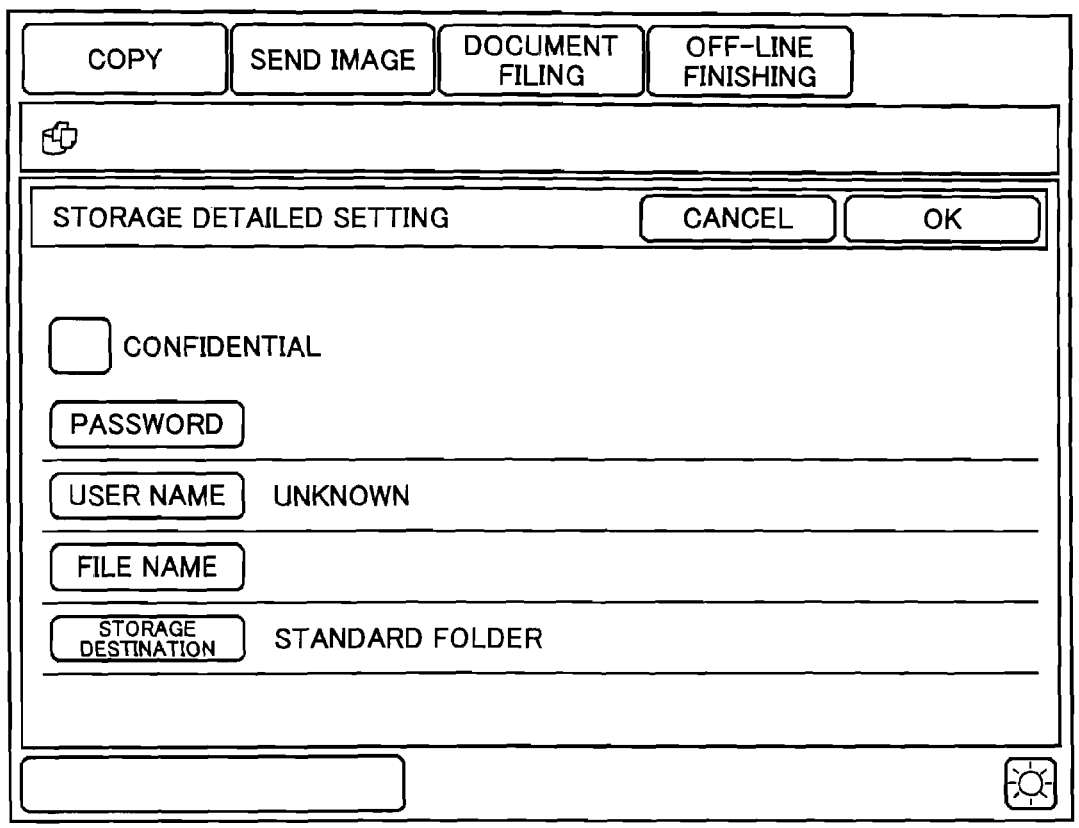
FIG. 5 shows an example of a storage detailed setting screen when storing image data in a case where a user does not perform user authentication.

Note that, in a case where a user does not perform user authentication, when storing image data, the storage detailed setting screen illustrated in FIG. 5 is displayed to request input of a user name, a file name, and a storage destination. In the screen of FIG. 5, the checkbox to perform "set the same password as one for user authentication" on the screen of FIG. 3 for confidential storing becomes in a non-display state or a grayed-out display, and a setting operation of confidential storing can be performed only by the process of "set optional password".

Figures 6, 7:
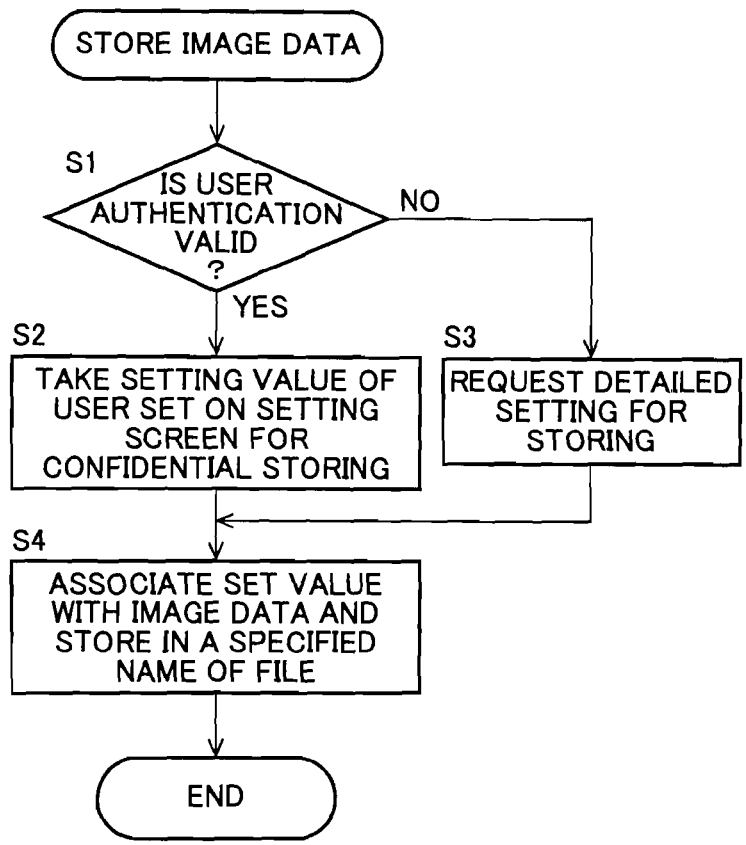
FIG. 6 is a flowchart showing processing procedure in a control portion when storage request of image data is made with a filing function.
FIG. 7 shows an example of the data structure registered in an association table.

Next, description will be given for an operational aspect of the control portion 24 when image data is stored. FIG. 6 is a flowchart showing processing procedure in the control portion 24 when storing request of image data is made with a filing function.

When using an image forming apparatus, whether or not user authentication has been performed is checked by the authenticating portion 25, and when user authentication has been performed (step S1/YES), a setting value (a password setting classification, a password, a user name, a file name, and a storage destination) received with a setting screen for confidential storing and stored in the storage portion 23 is acquired, and the processing goes to step S4 (step S2).

Alternatively, when user authentication has not been performed (step S1/NO), the storage detailed setting screen illustrated in FIG. 5 is displayed to request input of a user name, a file name, and a storage destination, and "no user authentication" is set to the password setting classification and "set optional password" is performed or nothing is set to the password, and the processing goes to step S4.

Subsequently, values acquired at step S2 and step S3 are associated with image data and stored in a file of a specified folder (step S4), and the processing is completed.

The association is managed by storing an association table in a filing area. In the association table, data items as illustrated in FIG. 7 are registered for each stored file.

Folder name: A name of a folder in which a file having image data stored therein is stored.

File name: A file name of image data.

Password setting classification: Any of "set optional password (with password confirmation)", "set the same password as one for user authentication (with password confirmation)", "set the same password as one for user authentication (no password confirmation)", and "store without setting password" is set.

Password: A password corresponding to a value of the password setting classification. Not set only when a value of the password setting classification is "store without setting password".

User name: A name of a user.

Next, description will be given for an operational aspect of the control portion 24 when image data is read. FIG. 8 is a flowchart showing processing procedure in the control portion 24 when request to read image data is made with a filing function.

First, a value of the password setting classification associated with image data to be read is checked (step S11).

When a value of the password setting classification associated with image data to be read is "store without setting password", it is determined that the image data is subjected to "store without setting password", that is, the image data is stored as image data accessible without a password, and the processing goes to step S16.

In addition, when a value of the password setting classification associated with image data to be read is "set optional password (with password confirmation)" or "set the same password as one for user authentication (with password confirmation)", it is determined that confirmation by a password is needed to read the image data, and procedure the processing goes to step S14.

In a case where a value of the password setting classification associated with image data to be read is "set the same password as one for user authentication (no password confirmation)", when user authentication of the apparatus is valid (step S12/YES), if a password associated with image data to be read is matched to a password used for user authentication (step S13/YES), the image data is capable of being read, and the processing goes to step S16.

Alternatively, when the password associated with image data to be read is different from the password used for user authentication (step S13/NO), when a value of the password setting classification associated with image data to be read is "set optional password (with password confirmation)" or "set the same password as one for user authentication (with password confirmation)", or when user authentication of the apparatus is not made valid, it is requested to enter a password of the image data to be read to receive input from the operation portion 16a (step S14).

Subsequently, when the password associated with image data to be read is matched to the password entered by a user (step S15/YES), the image data is capable of being read, and the processing goes to step S16.

Alternatively, when the password associated with image data to be read is different from the password entered by a user (step S15/NO), "a message showing that reading of the image data is rejected" is displayed to the display portion 16b for the user, and processing of reading the image data is completed (step S17).

When it is determined as capable of reading, the image data to be read is read from the storage portion 23 and output in a user-available state, and processing of reading the image data is completed (step S16).

In the above described configuration, it is possible to secure security of image data stored in the image forming apparatus and the image processing apparatus as well as to improve operability of processing of storing and reading the image data.

The present invention will not be limited to above described embodiments and many modifications and alterations can certainly be made within the scope of the present invention.

For example, in the above described embodiments, when a user is authenticated, a state where the user is authenticated continues unless the authentication is released, however, a case is considered that when this state continues, a usage not-permitted user illegally uses the image forming apparatus to take out data held in the apparatus to outside illegally or to communicate with an external computer not allowed to use, thus posing a problem of security management.

In this case, the above described embodiment may be configured so that when a predetermined time has elapsed after user was authenticated, or when a body sensor provided in the apparatus has not detected a human for a predetermined time, user authentication is automatically released.

According to the present invention, it is possible to secure security of image data stored in the apparatus as well as to improve operability of processing of storing and reading the image data.

The invention claimed is:

1. An image processing apparatus having a filing function, comprising:
   an authenticating portion for authenticating a user with a password; and
   a control portion configured to display an input screen with at least three options for storing image data using the filing function, the input screen indicating: to set an optional password, to use the same password as that used in the user authentication and require input of the password subsequently, or to use the same password as that used in the user authentication without requiring input of the password subsequently, wherein when setting of the optional password is specified, the optional password is acquired and stored in a storage portion in association with the image data, and when the same password as that used in the user authentication with or without requiring input of the password subsequently is selected, a classification of whether or not the password has been read is acquired, and if the classification of whether or not the password is confirmed is specified, the password used in the user authentication and the specified classification are stored in the storage portion in association with the image data.

2. The image processing apparatus as defined in claim 1, wherein in the control portion, at the time of reading the specified image data with the filing function, with reference to the storage portion, when the classification corresponding to the image data is set to confirm the password, input of a password is requested and whether or not reading is capable is determined based on the entered password and a password corresponding to the image data, alternatively, when the classification corresponding to the image data is set to not confirm the password, whether or not reading is capable is determined based on the password authenticated by the authenticating portion and the password corresponding to the image data.

3. The image processing apparatus as defined in claim 1, wherein in the control portion, at the time of reading the specified image data with the filing function, with reference to the storage portion, when the password corresponding to the image data and the password authenticated by the authenticating portion are different, input of a password is requested and whether or not reading is capable is determined based on the entered password and the password corresponding to the image data.

4. The image processing apparatus as defined in claim 1, wherein when a predetermined time has elapsed after the user was authenticated, the control portion releases authentication of the user.

5. The image processing apparatus as defined in claim 1 comprising a body sensor, wherein when a predetermined time has elapsed after the body sensor has not detected a human, the control portion releases authentication of the user.

6. An image forming apparatus comprising the image processing apparatus as defined in claim 1.

7. An image processing method of an image processing apparatus having a filing function, comprising:

an authentication step of authenticating a user with a password; and a control step, in which an input screen is displayed with at least three options for storing image data using the filing function, the input screen indicating; to set an optional password, to use the same password as that used in the authentication step and require input of the password subsequently, or to use the same password as that used in the user authentication without requiring input of the password subsequently, wherein when setting of the optional password is specified, the optional password is acquired and stored in a storage portion in association with the image data, and when the same password as that used in the authentication step with or without requiring input of the password subsequently is selected, a classification of whether or not the password has been read is acquired, and if the classification of whether to confirm the password is specified, the password used in the authenticating step and the specified classification are stored in the storage portion in association with the image data.

* * * * *